(12) United States Patent
Kwa et al.

(10) Patent No.: US 8,806,258 B2
(45) Date of Patent: *Aug. 12, 2014

(54) PLATFORM COMMUNICATION PROTOCOL

(75) Inventors: Seh W. Kwa, Saratoga, CA (US); Neil Songer, Santa Clara, CA (US); Rob Gough, Cornelius, OR (US); David J. Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 323 days.

This patent is subject to a terminal disclaimer.

(21) Appl. No.: 12/286,544

(22) Filed: Sep. 30, 2008

(65) Prior Publication Data

US 2010/0080272 A1 Apr. 1, 2010

(51) Int. Cl.
*G06F 1/12* (2006.01)
(52) U.S. Cl.
USPC .............................. 713/400; 713/310; 713/330
(58) Field of Classification Search
USPC .......... 713/310, 330, 400; 710/104, 105, 302, 710/311
See application file for complete search history.

(56) References Cited

U.S. PATENT DOCUMENTS

| | | | | |
|---|---|---|---|---|
| 4,509,125 A * | 4/1985 | Fattic et al. | ..................... | 701/61 |
| 6,317,839 B1 * | 11/2001 | Wells | ............................ | 713/320 |
| 6,763,444 B2 * | 7/2004 | Thomann et al. | ............. | 711/170 |
| 6,834,302 B1 * | 12/2004 | Harvell | ........................ | 709/224 |
| 6,851,068 B2 * | 2/2005 | Jochiong et al. | .............. | 713/330 |
| 7,058,738 B2 * | 6/2006 | Stufflebeam, Jr. | ............ | 710/104 |
| 7,120,711 B2 * | 10/2006 | Schaefer et al. | .............. | 710/104 |
| 7,248,470 B2 * | 7/2007 | Chen et al. | ............... | 361/679.41 |
| 7,346,723 B2 * | 3/2008 | Kim et al. | ..................... | 710/305 |
| 7,457,904 B2 * | 11/2008 | Lin et al. | ....................... | 710/302 |
| 7,555,630 B2 * | 6/2009 | Jain et al. | ......................... | 712/10 |
| 7,724,645 B2 * | 5/2010 | Bedwani et al. | ............... | 370/216 |
| 7,822,907 B2 * | 10/2010 | Slaight | ........................... | 710/311 |
| 7,831,849 B2 * | 11/2010 | Kwa et al. | ..................... | 713/310 |
| 7,904,610 B2 * | 3/2011 | Narayanan et al. | ............. | 710/15 |
| 8,239,692 B1 * | 8/2012 | Robillard et al. | ............ | 713/300 |
| 2006/0136643 A1 * | 6/2006 | Lin et al. | ....................... | 710/302 |
| 2006/0280195 A1 * | 12/2006 | Lopez et al. | .................. | 370/419 |
| 2008/0244287 A1 | 10/2008 | Kwa et al. | | |
| 2012/0287725 A1 * | 11/2012 | Ware et al. | ............... | 365/189.02 |

OTHER PUBLICATIONS

PCI-SIG. PCI Express Base Specification. Revision 1.0a. Apr. 15, 2003.*
Bhatt, Ajay. Creating a PCI Express Interconnect. White Paper. 2002.*
Kwa et al. PCI Express Architecture Power Management. Rev 1.1. Nov. 8, 2002.*
Xilinx. LogiCORE IP Endpoint PIPE v1.8 for PCI Express. Product Specification. Jul. 23, 2010.*

\* cited by examiner

*Primary Examiner* — Matthew D Spittle
(74) *Attorney, Agent, or Firm* — Patent Capital Group

(57) ABSTRACT

A host chipset heartbeat may be utilized, in some embodiments, to handle interrupts from external devices on a power efficient basis. The availability of the host chipset heartbeat may be signaled to external devices and those external devices may time their activities to a period of time when not only are resources available, but the assertion of the activity is advantageous because the host chipset is already transitioning from a lower power consumption state.

22 Claims, 2 Drawing Sheets

PLATFORM COMMUNICATION PROTOCOL

BACKGROUND

This relates to communications between external devices and a platform.

Conventionally, external devices communicate with a platform (such as a computer or other processor-based device) by posing interrupts, events, and notifications to the platform. These interrupts can come at any time and have no regard for what activity is currently being undertaken on the platform.

Ideally, the platform may enter idle states to reduce power consumption. When the processor is in a reduced power consumption state and an interrupt comes in from an external device, the interrupt may cause the platform to power up to handle the interrupt. As a result, in many cases, it is difficult for the platform to minimize its power consumption because it has no effective control over the timing of the interrupts that arrive from external devices.

DETAILED DESCRIPTION

Figure 1:
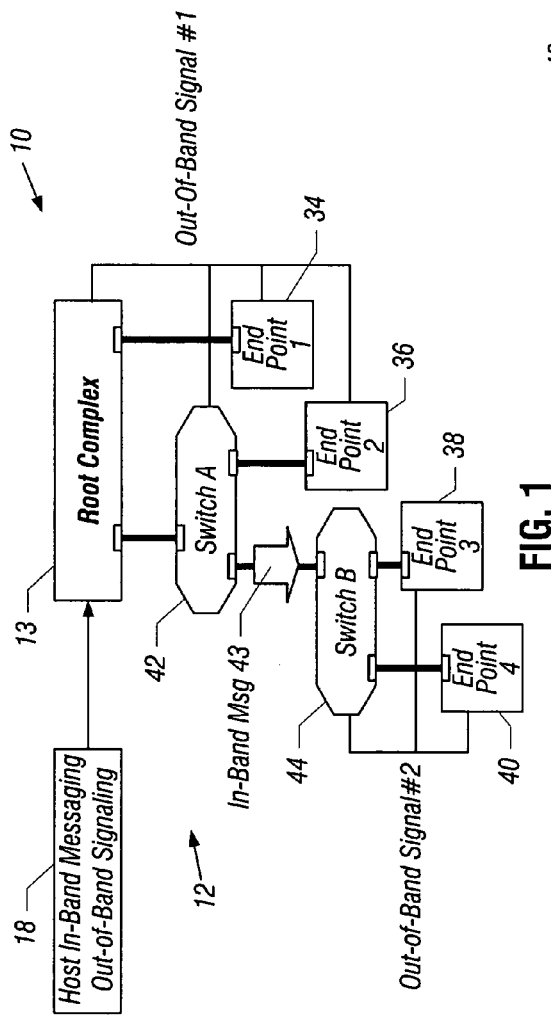
FIG. 1 is a schematic depiction of one embodiment of the present invention.

Platform power consumption may be reduced when activity within the system that includes both the platform and its external devices is aligned. As a result, the time that the system is idle may be increased which, in turn, allows better use of reduced power consumption states.

Generally, a system-wide clock is not visible to each source of activity. In other words, the system may include a number of external devices which are not synchronized with respect to communicating with the platform itself. In some embodiments, a synchronization mechanism that is system-wide may be provided by overlying existing sideband signaling or in-band messaging.

Without alignment, the external devices tend to assume bus mastering capabilities with an asynchronous interrupt generation or traffic cycle initiation. As a result, the platform would conventionally need to be designed to be ready for activities at any time, making platform power management less successful.

Generally, platform events follow an established timing, particularly when the platform is idle. An operating system timer tick is a form of scheduling reminder for the system microprocessor. Upon an interrupt that represents that scheduling reminder, the microprocessor conducts its workload in an active window and then enters a low power consumption state as it becomes idle. In one case, the interrupt may be IRQ0/8. The active window may be typically short, on the order of a few hundred microseconds, for a typical idle system. In contrast, the operating system timer tick may have a significantly longer periodicity. For example, Microsoft Windows® operating system has a current periodicity of 15.6 milliseconds. While that periodicity represents a significant idle period, there are also small time windows where some basic functions depend on system resource availability to make progress. An example is the support of display refresh in an idle system using a partial frame buffer.

These small time windows of system resource (such as system memory) availability, marked by synchronization signals, are known as heartbeats. Heartbeats are not necessarily periodic or static. The interval between heartbeats depends on the functionality, as well as the internal buffering resource on the platform. Since system resources, as well as the platforms themselves, are active during the heartbeats, interrupts and traffic cycles from external devices may be aligned in these heartbeat time windows. This may result in increasing the deterministic idle times on the platform and increasing power management opportunities.

In one embodiment, by extending an existing sideband signal used for devices to wake a sleeping system, external devices may be notified when opportunities exist to align their interrupts and traffic cycles to a time period when system resources are available. In addition to sideband signals, other signaling mechanisms may be used as well, including, for example, system management bus or simple serial transport (SST) approaches.

In other embodiments, in-band messaging may be used alone or in concert with out-of-band signaling to synchronize tasks, raised by external devices, with the host heartbeat. The in-band messaging may be particularly useful for devices that are not accessible via out-of-band signaling. These devices may include devices which have no out-of-band signaling infrastructure, as well as devices which are otherwise inaccessible by out-of-band signaling mechanisms.

To implement synchronization using out-of-band signaling, a broadcast mechanism may be used that may include global sideband signaling or messages through a system management bus. Use of sideband signaling is desirable, in some embodiments, because, otherwise, conventional signaling would defeat the intent if the primary interconnect or bus between the chipset and the device were prohibited to enter low power modes. In the following discussion, an example of shared sideband signal, available through PCI Express, to support the synchronization communication is provided, but the present invention is in no way limited to this specific example. See the PCI Express Base 2.0 Specification, Jan. 15, 2007, available from PCI-SIG, 3855 SW 153$^{rd}$ Drive, Beaverton, Oreg. 97006.

The use of a sideband WAKE# signal is further enhanced to provide the host chipset the ability to communicate the opportunity to synchronize traffic activities. The goal of this synchronization is to reduce platform power consumption by encouraging all system resources to perform direct memory access and microprocessor interaction activities in a common time window, such that the idle time between such activities is gathered together, allowing the use of lower power consumption states during this lengthened and more deterministic idle period.

In accordance with the PCI Express specification, an external device asserts WAKE# with the bus in the L2 state. As a result of the contact from the external device, the bus transitions to the L0 state after a period of time. In response, the chipset asserts a WAKE# signal and enters the L0 state from either the L0 or L1 state. The time for assertion of the WAKE# signal may be 10 nanoseconds to 50 microseconds, in some embodiments. The period of assertion of the WAKE# signal for the external device may be on the order of a microsecond in order to increase the time window for traffic alignment.

Referring to FIG. 1, a host chipset 12 in a platform or system 10 may be coupled to external devices. The external devices may include endpoints 34, 36, 38, and 40. They may also include other interfaces or components, such as the switch 44, as an example. The external devices may be any of the external devices conventionally found in computer systems, including a storage device, a display, an input/output (I/O) device, and a network card, to mention a few examples. The host chipset 12 may include a root complex 13 that may include one or more processors, system memory, a basic input/output system memory, and buses, among other components.

The host chipset 12 may include one or more internal switches 42. As used herein, a switch is simply a device that may or may not make downstream components directly inaccessible from the root complex. In one embodiment, the switch 42 may be configured so as to make the switch 44 inaccessible via out-of-band signaling. In such case, an in-band message 43, precipitated by the root complex and issued by the switch 42, may be used to communicate the availability of root complex resources to switch 44 and its downstream components, such as endpoints 38 and 40.

The host chipset 12 may assert the sideband WAKE# signal when the link is in the L0s or L1 state. Since the sideband WAKE# signal is a shared signal, it is possible for its assertion to occur when some links are in the L0s or L1 state, while others are in the L2 state.

When an external device asserts the sideband WAKE# signal, the host chipset 12 follows a standard wakeup sequence from the L2 state without change from the conventional PCI Express behavior. When the host chipset only asserts the sideband WAKE# signal, the host chipset 12 waits for the external device 14 to initiate a link training signaling exit from L0s or L1 and then initiates traffic. The external device initiates link training if traffic is desirable and, otherwise, remains in the L0s, L1, or L2 state.

If the host chipset 12 asserts the WAKE# signaling, followed by external device assertion, the host chipset and the external device use standard wakeup sequencing from the L2 state without change from conventional behavior. Other external devices with link states in the L0s or L1 states may observe those sideband WAKE# assertion as a hint to align their traffic when another device is waking up the system resource.

If the external device asserts the WAKE# signal, followed by the host chipset assertion, the host chipset avoids the sideband WAKE# assertion if it detected the assertion of a sideband WAKE# signal. The external device asserting the WAKE# signal continues the exit from the L2 state. Other external devices in L0s and L1 states may choose opportunistically to align their low power link state exit to initiate traffic.

In some embodiments, a notification is provided to external devices about the availability of system resources, as well as an internal resource. This affords external devices an opportunity to align their interrupts or traffic cycles when the resources become available, reducing the need to disturb the system resources and increasing power conservation.

In some embodiments, synchronization hints may be provided to external devices such that they can become well behaved in aligning their interrupt communication and traffic cycles with host chipset resource availability. Doing so affords greater power management opportunities.

Historically, the WAKE# signaling on a PCI Express link is a mechanism to support device signaling when desired to exit from deep system or device low power states. Through the use of the same mechanism to alert the device to the opportunity to align interrupt traffic cycles, a non-deep system or device low power system power conservation advantages may be achieved without significant additional overhead.

In cases where in-band messaging is more desirable or in cases (as described above) where an out-of-band signaling is not feasible, in-band messages may be utilized. In some cases, the root complex 13 may know the system 10 configuration or hierarchy. It may learn the system configuration, for example, as a result of an enumeration and configuration protocol used during the boot-up sequence. The basic input/output system may include code that causes devices within the system to be enumerated and enables the system to know the architecture or hierarchy of the system.

Then, the root complex 13 may determine how best to notify various external devices of the availability of root complex resources. In some cases, based on the hierarchy or configuration of the system, in-band messaging may be the best or only alternative and, in other cases, where suitable out-of-band signaling infrastructure is available, out-of-band signals may be utilized. It is also possible that, in some cases, entirely in-band messaging may be utilized and, in other cases, entirely out-of-band signaling may be utilized.

Figure 2:
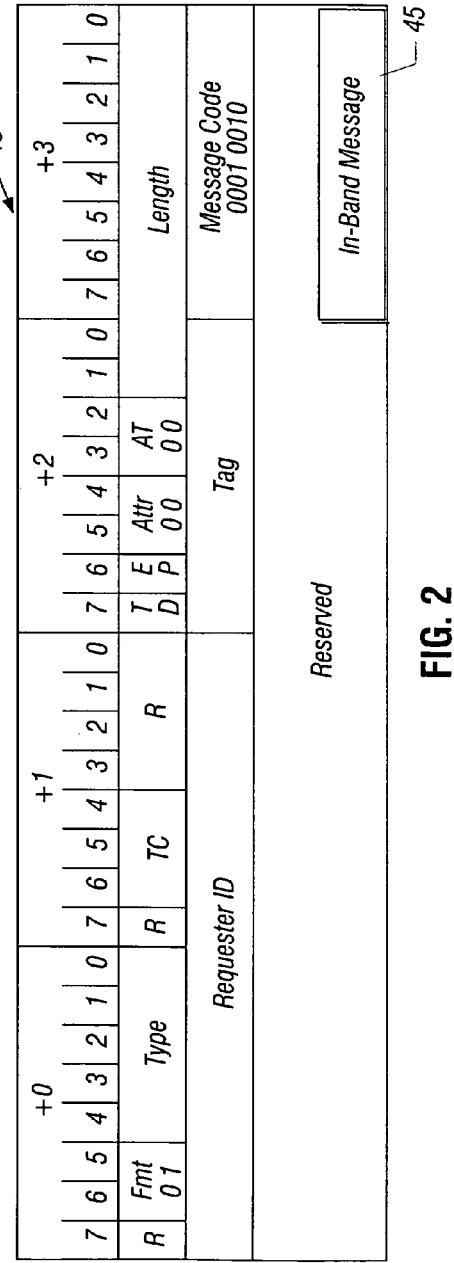
FIG. 2 is an in-band message packet format for one embodiment.

One message format for an in-band message 43, shown in FIG. 2, may include a conventional bus protocol message packet. In the example shown in FIG. 2, a PCI Express specification compliant message packet format is utilized. Bytes 0-3 provide conventional information about the nature of the message, including its length and type. Bytes 4-7 provide the requester ID, a tag, and a message code which, in one embodiment, uniquely identifies the packet as one relating to in-band messaging. Bytes 8-12 may be reserved and may include a particular in-band message code 45.

Figure 3:
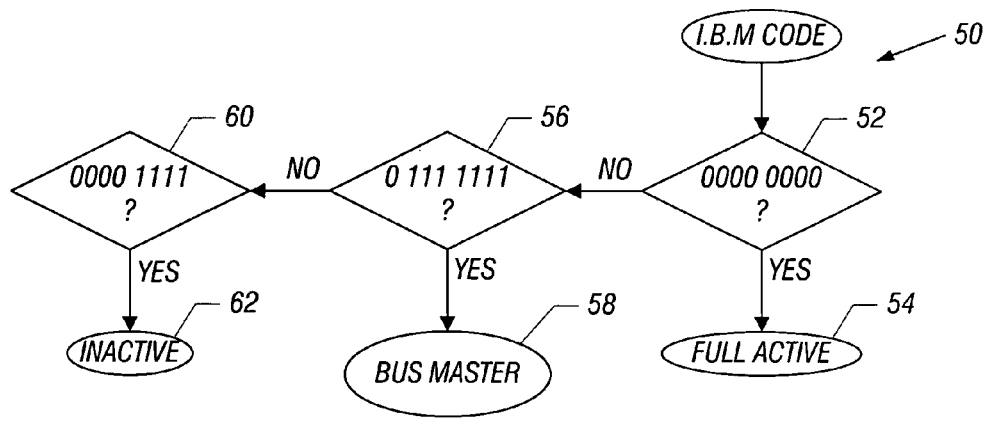
FIG. 3 depicts a sequence for decoding in-band messages.

The in-band message code 45, better shown in FIG. 3, may include a first code which is all zeros, indicated in diamond 52. When this first code is received, the endpoint knows that the root complex is fully active, as indicated in block 54. If that code is not the one that is received, then the sequence checks for a code, which includes a zero followed by all ones, indicating that a bus master mode is activated. In the bus master mode, the system memory path is available for device memory read/write bus master activities. If that code is not implicated, then, as determined in diamond 60, a code, which is zeros followed by ones, indicates that the root complex is inactive, as indicated in block 62.

In one embodiment, the in-band message may be a point-to-point message that propagates from an upstream component, such as root complex 13, to all downstream components. In the PCI Express protocol, it can be implemented as a 100b message, for example.

Thus, as one example, an endpoint may initially receive a code indicating that the root complex is inactive, may later receive a code indicating that the root complex is active, and then may receive a code indicating that the root complex is in bus master mode, and, finally, may receive a code indicating that the root complex is again inactive. In some embodiments, the endpoint may take advantage of the signaling that the root complex is active to implement bus mastering and initiation of interrupts. In this way, the system power consumption may be reduced and response time may actually be increased in some embodiments.

Figure 4:
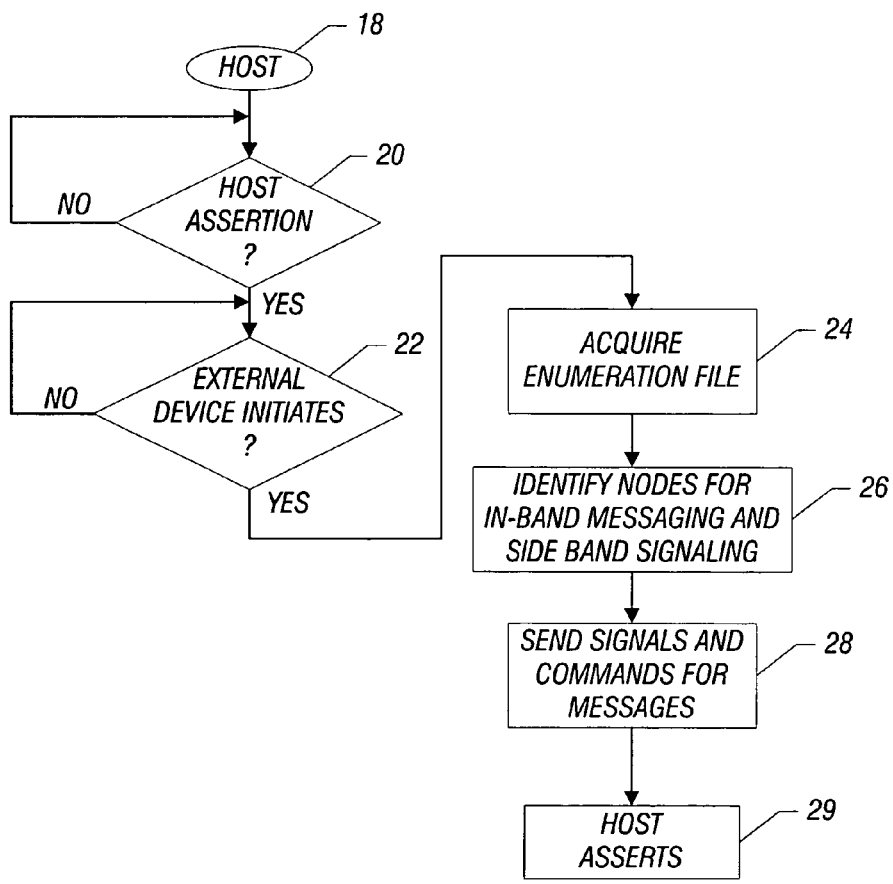
FIG. 4 is a sequence that may be utilized by the embodiment shown in FIG. 1 to handle communications from external devices.

Referring to FIG. 4, sequence 18 may be implemented by hardware, firmware, or software stored on the host chipset 12 or in connection with other components. In the case of a software implementation, a computer readable medium, such as a semiconductor memory, may be used to store the software. The software may be stored in the root complex 13, as indicated in FIG. 1, or elsewhere within the system. The computer readable medium may store instructions that, when executed, perform the sequence illustrated in FIG. 4.

Initially, the host software 18 checks for host assertion of in-band messaging or out-of-band signaling at diamond 20. If there is such an assertion, a check at diamond 22 determines whether an external device initiates messaging or signaling. If so, the host asserts the signaling or messaging (block 29) and the sequence proceeds as described above.

In block 24, the enumeration file, for example developed by the basic input/output system is acquired. The root complex identifies nodes for in-band messaging and side-band signaling, as indicated in block 26. Then, in block 28, the signals and commands for in-band messaging or side band signaling are sent as appropriate.

Namely, in the case of use of out-of-band signaling, if the external device is the only one that asserts the WAKE# signaling, both the external device and the host chipset sequence from the L2 state without change from conventional operation. When the host chipset alone asserts the WAKE# signaling, the host chipset waits for the external device to initiate link training, signaling the exit from L0s or L1 and then initiates traffic. The external device initiates link training if traffic is desirable and, otherwise, remains in the L0s, L1, or L2 states. In the case where a host chipset assertion is followed by external device assertion, the standard wakeup sequence may be utilized. Similarly, with external device assertion, followed by host chipset assertion, the host chipset avoids sideband WAKE# signal assertion if it detected the assertion of the sideband WAKE# signal. The external device asserts the sideband WAKE# signal and continues its exit from the L2 state.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer readable medium storing instructions to enable a computer to:
   identify heartbeats that are non-periodic time windows of computer resource availability of a system, wherein at least some of the heartbeats correspond to power state transitions of the system; and
   provide an in-band signal to a device external to said computer to enable said device to time its interaction with the system to the heartbeats, said device being awake when it receives said signal, wherein the in-band signal is to comprise a message packet that is to include a message code field and in-band message data, the message code field is encoded to indicate the in-band message data and the in-band message code is to be encoded to indicate to the device an activity state of a particular computer resource of the system.

2. The medium of claim 1 further storing instructions to selectively assert an out-of-band signaling or in-band messages to enable external devices to time their interaction with a system component including a host chipset.

3. The medium of claim 2 further storing instructions to cause said host chipset to assert a WAKE#sideband signal.

4. The medium of claim 1 further storing instructions to determine the computer hierarchy.

5. The medium of claim 4 further storing instructions to use said hierarchy to determine whether to notify an external device via in-band messaging or out-of-band signaling.

6. The medium of claim 4 further storing instructions to use an enumeration cycle to determine the system hierarchy.

7. A system comprising:
   a host chipset;
   an external device coupled to said host chipset; and
   said host chipset to initiate an in-band messaging signal to enable the external device to time its interaction with the host chipset to a host chipset non-periodic time window of computer resource availability, only if said device is awake when it receives said signal, wherein the time window corresponds to a power state transition of the host chipset and the in-band signal is to comprise a message-type packet that is to include a message code field and in-band message data, the message code field is encoded to indicate the in-band message data, and the in-band message code is to be encoded with a value to indicate to the external device an activity state of a particular computer resource of the host chipset.

8. The system of claim 7 wherein said host chipset to selectively initiate an out-of-band signal or an in-band message to signal an external device of the host chipset time window of resource availability.

9. The system of claim 8 wherein said host chipset to assert a sideband signal in the form of a WAKE#sideband signal.

10. The system of claim 7, said host chipset to determine the system hierarchy.

11. The system of claim 10, said host chipset to use the system hierarchy to determine whether to notify an external device via in-band messaging or out-of-band signaling.

12. An apparatus comprising:
    a component to:
    identify non-periodic time windows of computer resource availability of a system, wherein at least some of the windows correspond to power state transitions of the system; and
    send a message to a device coupled to said system to coordinate activities of said device that involve said system to the non-periodic time windows of resource availability when said device is awake when it receives said message, wherein the message is to comprise a message packet that is to include a message code field and in-band message data, the message code field is encoded to indicate the in-band message data, and the in-band message code is to be encoded with a value to indicate to the device an activity state of a particular computer resource of the system.

13. The apparatus of claim 12 wherein said apparatus is a host chipset.

14. The apparatus of claim 12, wherein said apparatus comprises a root complex.

15. The apparatus of claim 12, said component to implement out-of-band signaling.

16. The apparatus of claim 12, said component to selectively implement in-band messaging or out-of-band signaling.

17. The apparatus of claim 16 wherein said component to determine whether to use in-band messaging or out-of-band signaling, based at least in part on whether there are devices that are inaccessible to said component via out-of-band signaling.

18. The apparatus of claim 17 including a switch coupled to receive a command from said component and to forward an in-band message to elements coupled downstream of said switch.

19. The apparatus of claim 12 wherein the message is sent over a Peripheral Component Interconnect Express (PCIe)-compliant link.

20. The apparatus of claim 12 wherein the message code is capable of being encoded to indicate any one of a plurality of activity states of the resource, wherein the plurality of activity states include a plurality of power states including at least one low power state, and the power state transition comprises a transition from the low power state to another one of the plurality of power states.

21. The medium of claim 1, wherein the message packet is formatted according to a PCIe-compliant message packet format.

22. An apparatus comprising:

a component to:

identify non-periodic time windows of computer resource availability of a system, wherein at least some of the windows correspond to power state transitions of the system; and send a PCIe-compliant message packet to a device coupled to said system to coordinate activities of said device that involve said system to the non-periodic time windows of resource availability when said device is awake when it receives said message, wherein the message packet is to include an in-band message code field to be encoded with a binary value corresponding to a respective one of a plurality of available activity states of a particular computer resource of the system and the message code field is included in Byte 15 of the message packet.

* * * * *